Nov. 9, 1965 W. I. L. WU 3,217,260
ODD HARMONIC GENERATOR FOR PRODUCING SHORT ALTERNATELY POSITIVE AND NEGATIVE EQUALLY SPACED PULSES
Filed March 13, 1963
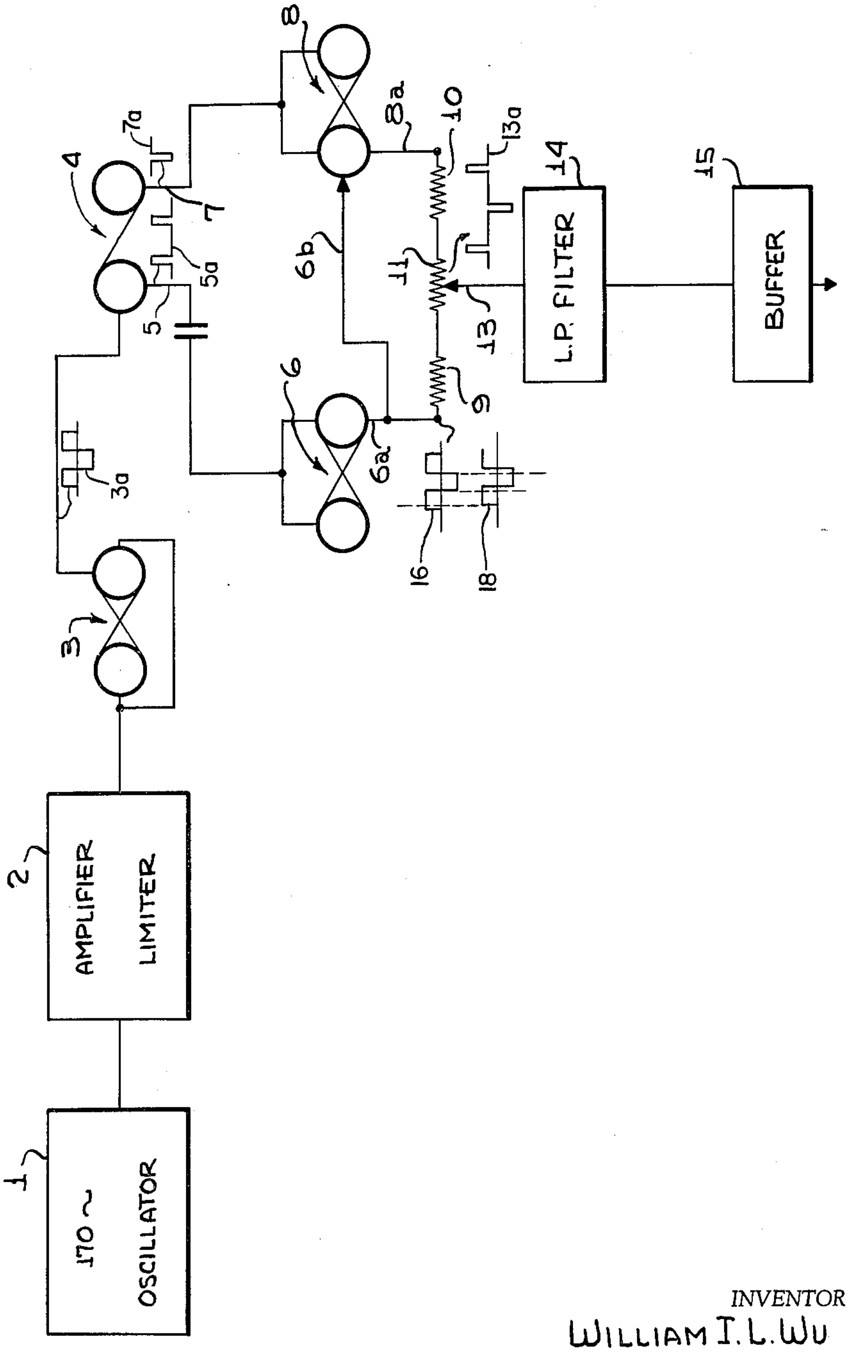
INVENTOR
WILLIAM T. L. WU
BY Hurvitz & Rose
ATTORNEYS United States Patent Office 3,217,260

Patented Nov. 9, 1965

3,217,260
ODD HARMONIC GENERATOR FOR PRODUCING SHORT ALTERNATELY POSITIVE AND NEGATIVE EQUALLY SPACED PULSES

William I. L. Wu, New Rochelle, N.Y., assignor to The Singer Company, a corporation of New Jersey Filed Mar. 13, 1963, Ser. No. 264,922
4 Claims. (Cl. 328—16)

The present invention relates generally to harmonic generators, and more particularly to binary systems for generating an extensive series of only odd harmonics, in terms of short alternately positive and negative equally spaced pulses having the fundamental frequency of the series of harmonics.

Briefly describing a preferred embodiment of the invention, a reference signal source having the required accuracy is utilized to generate a train of pulse pairs. The pulses of each pair are short and immediately adjacent, and the pulse frequency is locked to the frequency of the reference source. The first of each pair of pulses synchronizes a first binary divider, and the second synchronizes a second binary divider. These generate two trains of rectangular A.C. pulses, which are phase separated. The trains of pulses are combined additively to form a single train of short pulses alternately positive and negative polarities, to form the required output train. The fundamental frequency of the output train, i.e. the repetition rate of its positive (or negative) component, is locked to the frequency of the reference source. The duration of each pulse is equal to the time delay between the pulses of each adjacent pulse pair, and can be selected to be sufficiently short to provide the required number of harmonics. The wave shape being symmetrical with respect to zero level contains no even harmonics.

It is, accordingly, an object of the invention to provide a system for generating a series of harmonically related frequencies containing only odd harmonics.

It is another object of the invention to provide a system for generating a series of odd harmonics by means of purely binary circuitry.

It is a further object of the invention to provide a system for generating a train of alternately positive and negative short pulses having symmetry with respect to a zero amplitude axis, and relatively long spacing, under control of a reference frequency source, and by purely binary circuitry.

The above and still further objects, features and advantages of the present invention will become apparent upon consideration of the following detailed description of one specific embodiment thereof, especially when taken in conjunction with the accompanying drawing, wherein the single figure of the drawings is a block diagram of a system according to the invention.

Referring now to the accompanying drawing, the reference numeral 1 denotes a standard frequency source, specifically a precision tuning fork oscillator operating at 170 c.p.s. and having an accuracy of .01%. The output of oscillator 1 is amplified and clipped in amplifier-limiter 2 to provide square waves. The latter control a binary divider 3, having a square wave output at 85 c.p.s., having a wave shape illustrated at 3*a*. The wave shape 3*a* is applied to a monostable pulse generator 4, which operates in response to the wave fronts of the waves 3*a*. The output leads 5 and 7 of monostable pulse generator 4 accordingly contain pulses of opposite polarities, 5*a* and 7*a*, respectively. The pulses 5*a* are arranged to be 30 microseconds in duration. The pulses 5*a* and 7*a* are therefore 30 microseconds apart in time, and trigger two binary dividers 6 and 8. The outputs of the dividers 6 and 8 are therefore square waves at 42.5 c.p.s. but with a relative phase delay of 30 microseconds. The lead 6*b*, extending from the second stage of divider 6 to the first stage of divider 8 provides synchronizing pulses which assure that the two dividers maintain correct relative states.

The dividers 6 and 8 operate in opposite phases since they are triggered by pulses 5*a* and 7*a*, respectively, which are of opposite polarities. Outputs of the same polarities, allowing for 30 microsecond phase delay, are derived from the second stage of divider 6, via lead 6*a*, and from the first stage of divider 8, via lead 8*a*. These outputs are of the same polarities over most of their durations but being relatively delayed by 30 microseconds are of opposite polarities for 30 microseconds as illustrated by waveforms 16 and 18, respectively. The leads 6*a* and 8*a* terminate on the ends of a potentiometer including series resistances 9 and 10 directly connected to leads 6*a* and 8*a*, and a connecting central resistance 11 supplied with a slider 13. On the latter appears the difference of the pulses on leads 6*a* and 8*a*, the slider being set to compensate for any inequality of pulse output deriving from the dividers 6 and 8. This output is in the form of 30 microsecond pulses which are alternatively of opposite polarities, since superposed parts of the two trains of pulses deriving from dividers 6 and 8, when these are of the same polarities, cancel, but when of opposite polarities add.

The pulse train available on slider 13 is filtered in a low pass filter which has a cut-off of about 3 kc. so that a series of desired harmonics become available at the output of the filter 14. All even harmonics are balanced out in the output of the system, while odd harmonics persist, because the pulse train, 13*a*, is symmetrical about zero level. The shortness of the pulses assures that the highest desired harmonic present in the output of filter 14, i.e. about 3 kc., will be within 5% in amplitude of the lowest frequency component.

A practical field of utilization of the harmonic generator of the present invention is in the provision of marker frequencies for testing by means of panoramic comparison devices of spectrum analysis, the accuracy of transmitted signals in the teletype service of telephone companies. These utilize 16 channels, having center frequencies starting at 42.5 c.p.s. and terminating at 2975 c.p.s. in steps separated by 170 c.p.s. Mark and space frequencies are arrived at by adding and subtracting 42.5 c.p.s., respectively, to the center frequencies. The space and mark frequencies are thus all odd harmonics of 42.5 c.p.s., to 3017.5 c.p.s. at the upper limit, and can be provided by the system of the invention without admixture of even harmonics and at substantially uniform amplitude over the entire spectrum of interest.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. A harmonic generator for generating only odd harmonics, comprising a source of reference square wave signals of fixed period, a monostable pulse generator responsive to each leading edge of said square wave signals to generate a pair of signals adjacent in time and of shorter duration than said fixed period, a pair of binary frequency dividers responsive each to one of said pair of signals to generate a pair of further overlapping square wave signals relatively displaced in phase by the duration of one of said pair of signals, and means responsive to said further square wave signals to generate a train of short pulses having alternate positive and negative polarities.

2. In a generator of only odd harmonics of a reference frequency, a source of signal of fixed period, means for generating pairs of immediately adjacent pulses of alternate polarities, successive pairs of said pulses being separated by long time intervals relative to the duration of each pair of said pulses, the sum of said duration and one of said intervals being equal to said fixed period, means for applying said signal to said pulse generating means to trigger the generation of said pairs of pulses, separate binary dividers responsive to opposite polaritiy pulses of said pairs of pulses, respectively, for producing two trains of rectangular waves having phase separation equal to the duration of one of said pulses, means for combining said trains of rectangular waves to form a train of alternately positive and negative pulses each having a width equal to the duration of one of said pair of pulses, said train of pulses consisting only of odd harmonics of said reference frequency, and means for simultaneously applying said phase-separated trains of rectangular waves to said means for combining.

3. Apparatus for generating an output pulse train of alternate polarity pulses of equal amplitudes and durations consisting only of odd harmonics of a predetermined fundamental frequency, comprising means for producing square wave signals of sub-harmonic frequency relative to the frequency of a reference signal applied thereto, means for applying to said square wave signal producing means a reference signal having a frequency harmonically related to said fundamental frequency, means responsive to said square wave signal for generating pairs of alternate polarity pulses of equal durations less than the durations of one-half cycle of said square wave signal, each pair of pulses separated by an interval equal to the remaining duration of one full cycle of said square wave signal, a pair of means each responsive respectively to opposite polarity pulses of said pairs of pulses to generate further square wave signals each displaced in phase relative to the other by the duration of one of said pair of pulses, and means for additively combining said phase-displaced further square wave signals to produce said output pulse train.

4. The combination according to claim 3 wherein said first-named square wave signal producing means and said pair of further square wave signal producing means each include a binary frequency divider, and wherein said means for generating pairs of alternate polarity pulses includes a monostable pulse generator, and wherein said means for additively combining includes adjustable resistance means having a pair of input terminals for respectively receiving said further square wave signals, and an output terminal adjustable to compensate resistively for inequality in amplitude of said further square wave signals about a fixed datum point.

References Cited by the Examiner

UNITED STATES PATENTS

| | | | |
|---|---|---|---|
| 2,226,459 | 12/40 | Bingley | 328—28 X |
| 2,546,371 | 3/51 | Peterson | 328—57 |

ARTHUR GAUSS, *Primary Examiner.*

GEORGE N. WESTBY, *Examiner.*